Patented Sept. 22, 1953

2,653,087

UNITED STATES PATENT OFFICE 2,653,087

METHOD FOR INDUCTION OF BUD FORMATION IN PLANT TISSUES

Folke Skoog, Madison, Wis., assignor to Wisconsin Alumni Research Foundation, Madison, Wis., a corporation of Wisconsin No Drawing. Application January 26, 1950,
Serial No. 140,755

10 Claims. (Cl. 71—2.4)

1

The present invention relates to a method for vegetative propagation of plants. More specifically, the present invention is directed to the chemical induction of bud formation in tissues from plant organs including stems, roots, leaves and simple parenchyma tissue.

It has been known for some time that auxins, i. e. chemicals such as indoleacetic acid and naphthaleneacetic acid and the like, induce root growth in plant cuttings. See U. S. Patent 2,129,598, dated September 6, 1938. However, up until the time of the present invention, no satisfactory method was known for inducing bud formation in plant tissues, including tissues which normally do not form buds. As bud formation along with root growth is necessary for vegetative propagation of plants, the art has long desired a practical method for induction of bud formation in plant tissues.

The principal object of the present invention is to provide an improved method for vegetative propagation of plants.

A more specific object of the present invention is to provide a practical method for inducing bud formation in plant tissues, including tissues which do not normally form buds.

Other objects of the present invention will be apparent as the description proceeds hereinafter.

During an investigation of methods for vegetative propagation of plants, I discovered that purine compounds, and particularly the aminopurine compounds and salts thereof, induce bud formation in plant tissues. Investigations show the preferred compounds to be adenine used in salt form such as adenine sulfate, adenylic acid and guanine. Other purine or purine-containing compounds which may be used to induce bud formation are adenosine and nucleic acid. Only small amounts of the purine compounds are needed to induce bud formation, although the use of at least about 1 mg./liter of aqueous nutrient culture medium is preferred as smaller amounts do not generally induce bud formation in the amounts desired. The use of over 100 mg./liter of purine compound, particularly of the adenine type, should generally be avoided, as higher concentrations tend to be toxic and may deleteriously affect desired plant growth. The preferred range is about 20–50 mg. of purine compound per liter of culture medium with 40 mg. of adenine per liter (used for example as a sulfate salt) being a preferred composition.

The bud formation is induced by placing the plant tissue in an aqueous or agar nutrient medium containing the purine compound and preferably a mineral salt medium with or without a carbohydrate source containing a small amount of purine compound of the type described above. The White culture medium with illustrative procedures for its use is disclosed in Skoog et al., Amer. Jour. Bot. 35, 782–787 (1948). To provide a semi-solid medium on which the plant material can be supported agar may be added in concentrations from about 0.7 to 1.5%. While any of the plant nutrient media may be employed, investigations have shown that the presence of a soluble phosphate such as an alkali (sodium, potassium or ammonium) phosphate in combination with the purine compound is desirable for bud formation. The culture medium preferably should contain about 10–40 mg./l. of soluble phosphate (e. g. $KH_2PO_4$). Investigations have also shown that the pH of the nutrient medium should be about 4–8, with the acidic pH's (4–6) being preferred for induction of bud formation. The pH of the nutrient medium may be adjusted to the desired value by addition of alkalies such as sodium hydroxide, acids such as hydrochloric acid, or acid salts, etc.

Where it is desired to stimulate or increase root growth along with bud formation, minute amounts of auxins such as indoleacetic acid and naphthaleneacetic acid may be added to the purine-containing nutrient medium. It is important that the chemicals inducing root growth be used in relatively small amounts as experiments with tobacco have shown that concentrations in excess of 0.02 mg./l. of naphthaleneacetic acid will prevent bud formation in a nutrient medium containing 40 mg./l. of adenine sulfate. Nutrient media containing about 40 mg./l. of adenine sulfate and 0.001–0.005 mg./liter of indoleacetic acid have been found to yield good bud formation along with good root growth.

The method of the present invention may be used with tissues of various types or species of plants. Illustrative examples are tobacco, horseradish, carrot, etc. When using the carrot, the sub-culture of root segment should be used as the purine compounds may not induce bud formation in the first culture. Under appropriate nutritional conditions of the type set forth above, the buds develop normally and on transplantation to soil produce mature plants.

The following tables recording representative data obtained by experiments carried out in accordance with the culture methods of Skoog et al., supra, will serve to further illustrate the present invention.

TABLE I

*Effect of concentration of adenine sulfate on bud formation in tobacco stem segments cultured in vitro. Initial pH 4.0*

| Concentration Adenine sulfate | Number of Cultures | Number of buds formed per 10 segments | | |
|---|---|---|---|---|
| | | After 10 days | After 20 days | After 28 days |
| 0 | 42 | 0 | 0 | 1.6 |
| 20 mg./l | 39 | 0.7 | 5.9 | 10.7 |
| 40 mg./l | 42 | 5.0 | 19.7 | 27.8 |

TABLE II

*Tobacco callus cultured in vitro for 33 days*

| Concentration Adenine Sulfate | Number of Calli | Number of Buds |
|---|---|---|
| 0 (control) | 27 | 0 |
| 2.5 mg./l | 30 | 4 |
| 5 mg./l | 20 | 10 |
| 10 mg./l | 21 | 14 |

TABLE III

*Effects of adenine sulfate and increasing concentrations of $KH_2PO_4$ added to the nutrient medium on the formation of buds in stem segments of tobacco (pH 4.0)*

| Concentrations (mg./l.) of— | | No. of tissues cultured | Buds formed per 10 segments after— | | | |
|---|---|---|---|---|---|---|
| Adenine Sulfate | $KH_2PO_4$ | | 20 days | 28 days | 37 days | 50 days |
| 0 | 12 | 16 | 0 | 0 | 0.6 | 0.6 |
| 40 | 12 | 14 | 3.5 | 7.8 | 10.7 | 15.7 |
| 40 | 36 | 16 | 7.7 | 15.5 | 21.1 | 25.0 |
| 40 | 108 | 18 | 2.5 | 9.3 | 13.7 | 15.0 |

TABLE IV

*Effects of adenine sulfate and indoleacetic acid applied singly and in combinations to the nutrient medium on the formation of buds in root segments of horse radish (pH 4.0, $KH_2PO_4$ conc. of medium 37.5 mg./l.)*

| Concentrations (mg./l.) of— | | No. of tissues cultured | Buds formed per 10 segments after— | | | |
|---|---|---|---|---|---|---|
| Adenine Sulfate | Indoleacetic acid | | 15 days | 28 days | 37 days | 50 days |
| 0 | 0 | 30 | 1.6 | 5.2 | 10.0 | 11.4 |
| 40 | 0 | 27 | 4.4 | 10.8 | 19.0 | 20.9 |
| 0 | 0.02 | 30 | 0 | 0.3 | 1.6 | 3.7 |
| 40 | 0.02 | 18 | 3.3 | 9.3 | 18.6 | 22.0 |

TABLE V

*Effect of adenine sulfate added to the nutrient medium at different pH values on the formation of buds in stem segments of tobacco*

| Concentrations mg./l. adenine sulfate | Initial pH of Medium | No. of tissues cultured | Buds formed per 10 segments after— | | |
|---|---|---|---|---|---|
| | | | 18 days | 28 days | 60 days |
| 0 | 4.0 | 24 | 0 | 0 | 0 |
| 40 | 4.0 | 27 | 4.8 | 10.7 | 15.9 |
| 40 | 5.0 | 21 | 0 | 1.9 | 4.7 |
| 40 | 6.0 | 24 | 0 | 2.0 | 5.0 |
| 40 | 7.0 | 18 | 0 | 2.2 | 3.8 |

It will be understood that the above data are merely representative and that the present invention is not limited thereto. It will also be understood that the terms "purine" or "amino-purine compound" are directed to compounds characterized by the purine rings and purine compounds characterized by an amino group such as found in adenine, guanine, etc. While the use of about 20-50 mg./l. of adenine, adenylic acid, guanine, adenosine and the like is generally preferred, the use of about 20-80 mg./l. of the larger purine-containing molecules such as nucleic acid is preferred. The optimum amount of purine compound may also vary somewhat with the particular plant tissue employed as well as with the nutrient medium, but may be readily ascertained by preliminary experimental test. As used in the specification and claims, the terms purine and amino-purine cover the acid salts thereof, of which adenine sulfate, chloride, nitrate, etc. are illustrative examples of mineral acid salts.

I claim:

1. In a method for vegetative propagation of plants, the improvement which comprises inducing bud formation in plant tissue by culturing the tissue in a nutrient medium containing a soluble phosphate and between 1 mg./liter and 100 mg./liter of an amino-purine compound.

2. In a method for vegetative propagation of plants, the improvement which comprises inducing bud formation in plant tissue by culturing the tissue in a nutrient medium containing a soluble phosphate and about 20-50 mg./liter of adenine.

3. In a method for vegetative propagation of plants, the improvement which comprises inducing bud formation in plant tissue by culturing the tissue in a nutrient medium containing a soluble phosphate and about 20-50 mg./liter of adenylic acid.

4. In a method for vegetative propagation of plants, the improvement which comprises inducing bud formation in plant tissue by culturing the tissue in a nutrient medium containing a soluble phosphate and about 20-50 mg./liter of guanine.

5. In a method for vegetative propagation of plants, the improvement which comprises inducing bud formation in plant tissue by culturing the tissue in a nutrient medium containing a soluble phosphate and about 20-80 mg./liter of nucleic acid.

6. In a method for vegetative propagation of plants, the improvement which comprises inducing bud formation in plant tissue by culturing the tissue in a nutrient medium containing a soluble phosphate and about 40 mg./liter of adenine sulfate.

7. In a method for vegetative propagation of plants, the improvement which comprises inducing bud formation in plant tissue by culturing the tissue in a nutrient medium at a pH of about 4-8 containing about 10-40 mg./liter of soluble phosphate and about 20-50 mg./liter of an amino-purine compound.

8. The method of claim 7 in which the culture medium, in addition to the purine chemical inducing bud formation, contains up to about 0.02 mg./l. of an auxin chemical inducing root growth.

9. In a method for vegetative propagation of plants, the improvement which comprises inducing bud formation in plant tissue by culturing the tissue in a nutrient medium at a pH of about 4-6 containing about 10-40 mg./liter of an alkali phosphate and about 40 mg./liter of adenine sulfate.

10. The method of claim 9 in which the culture medium, in addition to adenine sulfate, contains about 0.001–0.005 mg./liter of indoleacetic acid.

FOLKE SKOOG.

References Cited in the file of this patent

Traub: Proc. Am. Soc. Horticultural Science, vol. 35, p. 439 (1937).

Skoog et al.: Am. J. Botany, vol. 35, pp. 782 to 787 (Dec. 1948).

Bonner et al.: Proc. National Acad. Sciences, vol. 25, pp. 184 to 188 (1939).

Duggar: Annals of the Missouri Botanical Garden, vol. 7, p. 3 (1920).

"Growth of Plants," by Crocker (Reinhold Pub. Co. 1948) p. 206.